US009860491B2

(12) United States Patent
Park et al.

(10) Patent No.: US 9,860,491 B2
(45) Date of Patent: Jan. 2, 2018

(54) REFRIGERATOR HAVING A CAMERA AND METHOD OF OPERATING THE SAME BASED ON POSITION OF A DOOR

(71) Applicant: LG ELECTRONICS INC., Seoul (KR)

(72) Inventors: Sehwan Park, Seoul (KR); Samnyol Hong, Seoul (KR); Sungdu Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 395 days.

(21) Appl. No.: 14/255,174

(22) Filed: Apr. 17, 2014

(65) Prior Publication Data

US 2014/0313328 A1     Oct. 23, 2014

(30) Foreign Application Priority Data

Apr. 18, 2013 (KR) .................. 10-2013-0042841

(51) Int. Cl.
*H04N 7/18* (2006.01)
*F25D 29/00* (2006.01)

(52) U.S. Cl.
CPC ............ *H04N 7/183* (2013.01); *F25D 29/00* (2013.01); *F25D 2400/361* (2013.01); *F25D 2500/06* (2013.01); *F25D 2700/02* (2013.01)

(58) Field of Classification Search
CPC ............... F25D 2700/00; F25D 29/005; F25D 2400/361; F25D 2500/00
See application file for complete search history.

(56) References Cited

U.S. PATENT DOCUMENTS

| | | | | |
|---|---|---|---|---|
| 6,888,574 B1 * | 5/2005 | Asakura | ................ | H04N 5/232 348/231.99 |
| 2003/0140090 A1 * | 7/2003 | Rezvani | ................ | H04L 41/22 709/203 |

(Continued)

FOREIGN PATENT DOCUMENTS

| | | | |
|---|---|---|---|
| CN | 101504238 A | | 8/2009 |
| CN | 102853624 A | | 1/2013 |

(Continued)

OTHER PUBLICATIONS

European Search Report issued in application No. 14164926.9 dated Jul. 25, 2014.

*Primary Examiner* — Jay Au Patel
*Assistant Examiner* — Marnie Matt
(74) *Attorney, Agent, or Firm* — Ked & Associates, LLP

(57) ABSTRACT

A refrigerator may include a detection device that detects at least one of a position or movement of a door of the refrigerator, a camera to capture an image of an area inside the refrigerator, and a controller to control the camera to capture the image based on the detected position or movement of the door. A start of a door opening operation and a door closing operation may be detected based on the detected position or movement of the door. When the door opening operation is detected, the camera is controlled to operate in a standby mode, and when the door closing operation is detected, an angle of the door is compared with a reference angle. When the angle of the door is less than the reference angle, the camera is controlled to operate in a photographing mode to capture the image of the area inside refrigerator.

17 Claims, 9 Drawing Sheets

(56) References Cited

U.S. PATENT DOCUMENTS

| | | | | |
|---|---|---|---|---|
| 2004/0183417 A1* | 9/2004 | Ahmed | ............... | F25D 23/04 312/408 |
| 2007/0152048 A1* | 7/2007 | Jung | ............... | G06Q 10/087 235/385 |
| 2010/0046791 A1* | 2/2010 | Glickman | ............ | G06K 9/209 382/100 |
| 2010/0170289 A1* | 7/2010 | Graziano | ............... | F25D 23/02 62/449 |
| 2012/0105424 A1* | 5/2012 | Lee | ............... | G09F 9/35 345/212 |
| 2012/0265348 A1* | 10/2012 | Kim | ............... | F25D 17/042 700/275 |
| 2013/0067375 A1* | 3/2013 | Kim | ............... | F25D 29/00 715/769 |
| 2013/0186124 A1* | 7/2013 | Wiklinski | ............ | G06Q 10/087 62/264 |
| 2014/0168396 A1* | 6/2014 | Kempiak | ............... | H04N 7/18 348/61 |
| 2016/0123659 A1* | 5/2016 | Kim | ............... | F25D 29/00 62/125 |

FOREIGN PATENT DOCUMENTS

| | | | | |
|---|---|---|---|---|
| CN | 102889747 A | | 1/2013 | |
| CN | 102937366 A | | 2/2013 | |
| CN | 202885433 U | | 4/2013 | |
| JP | 08049958 | * | 2/1996 | ............ F25D 23/00 |
| JP | 2001-317858 A | | 11/2001 | |
| JP | 2003-042626 A | | 2/2003 | |
| JP | 2004-183987 A | | 7/2004 | |
| JP | 2006-084132 A | | 3/2006 | |
| JP | 2010121784 A | * | 6/2010 | |

* cited by examiner

REFRIGERATOR HAVING A CAMERA AND METHOD OF OPERATING THE SAME BASED ON POSITION OF A DOOR

CROSS-REFERENCE TO RELATED APPLICATIONS

This application claims priority under 35 U.S.C. §119 to Korean Patent Application No. 10-2013-0042841, filed on Apr. 18, 2013, whose entire disclosure is hereby incorporated by reference.

BACKGROUND

1. Field

The present disclosure relates to a refrigerator and a method of operating the same, and more particularly, to a refrigerator configured to acquire an image of a storage compartment and a method of operating the same.

2. Background

Refrigerators and methods of operating the same are known. However, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION

Figure 1:
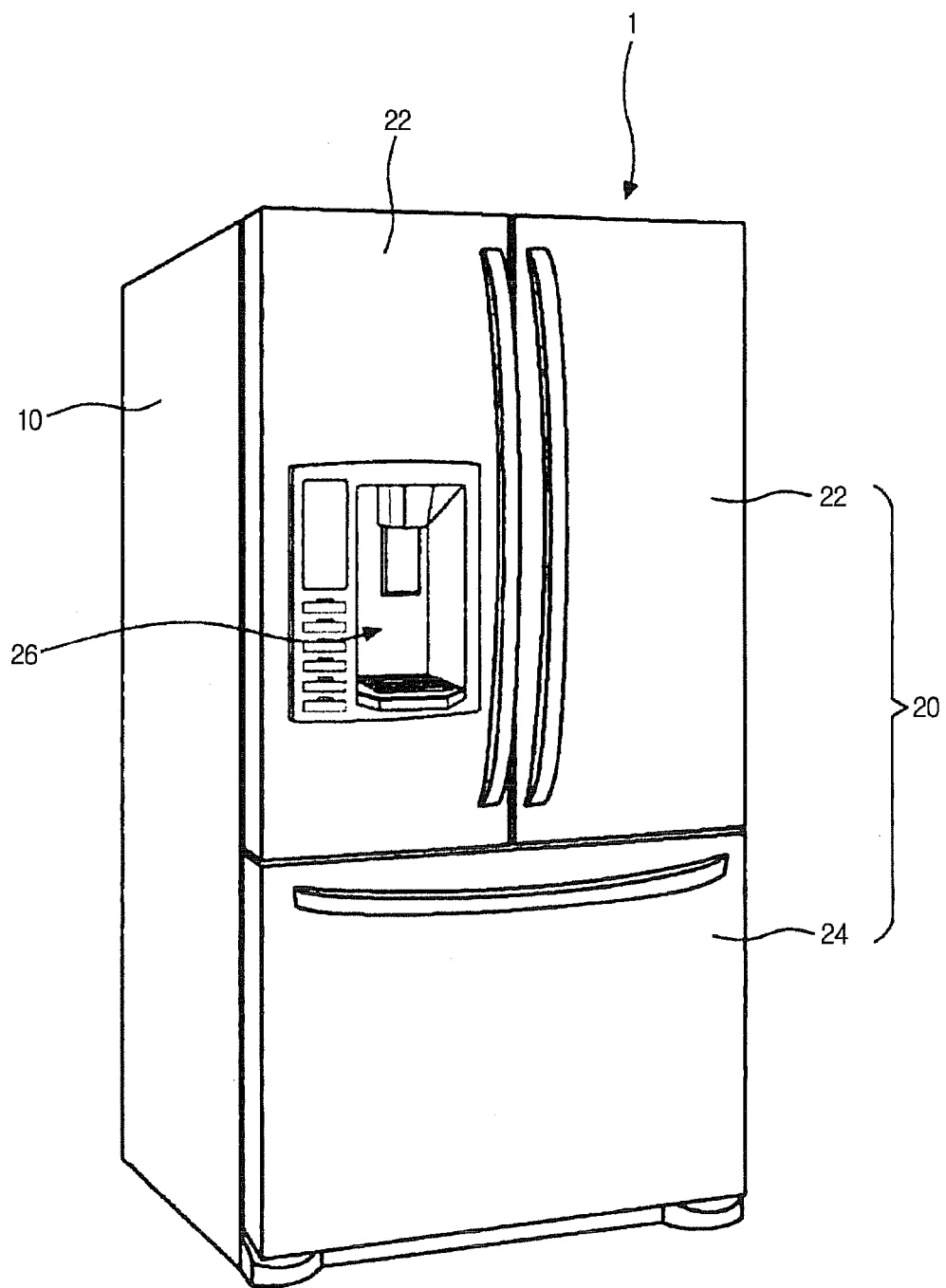
FIG. 1 is a perspective view of a refrigerator according to an embodiment.

Hereinafter, exemplary embodiments of the present disclosure will be described in detail with reference to the accompanying drawings. In the drawings, the shapes and sizes of elements are exaggerated for clarity. Also, terms used in this specification are terms defined in consideration of functions according to embodiments, and thus, the terms may be changed according to the intention or usage of a user or operator. Therefore, the terms should be defined on the basis of the overall contents of this specification.

The disclosure may, however, be embodied in many different forms and should not be construed as being limited to the embodiments set forth herein; rather, that alternate embodiments included in other retrogressive disclosures or falling within the spirit and scope of the present disclosure will fully convey the concept of the disclosure to those skilled in the art.

Refrigerators are apparatuses in which cool air generated by a refrigeration cycle is supplied into a refrigerating compartment and a freezing compartment to maintain various foods in a fresh state for a long time. In general, such a refrigerator includes a main body having a refrigerating compartment and a freezing compartment which store foods. Moreover, a door may be rotatably coupled to a side of the main body to open or close the refrigerating compartment and the freezing compartment.

Also, components of a refrigeration cycle that is constituted by a compressor, an evaporator, and an expansion valve may be provided in the main body. Thus, cool air generated in the evaporator may be supplied into the refrigerating compartment and the freezing compartment such that foods stored in the refrigerating compartment and the freezing compartment may be stored for extended periods of time at low temperatures. That is, the freezing compartment may be maintained at a cooling temperature of about −18° C. or less, and the refrigerating compartment may have a cooling temperature range of around 2° C.

Also, the refrigerating compartment may be partitioned into a plurality of spaces by shelves to efficiently perform reception and storage of the stored goods according to kinds of stored goods. That is, a storage chamber for storing meats, fishes, and the like may be provided in an upper region of the refrigerating compartment, and a storage chamber for storing vegetables, fruits, and the like may be provided in a lower region of the refrigerating compartment.

Moreover, a display unit such as an LCD panel for providing information with respect to the refrigerator and controlling the refrigerator may be provided on the door of the refrigerator. The information may include contents of the refrigerator, recipes using the available contents, etc. However, in order to obtain such information, a user may be required to physically open the door and manually determine the contents of the refrigerator.

Hence, it is desirable to automatically obtain contents of the refrigerator to display information for the user, without requiring the user to manually verify the contents of the refrigerator. Accordingly, as embodied and broadly described herein, a refrigerator is provided that is configured to acquire contents of the storage compartments and a method of operating the same.

For convenience of description, a bottom freezer type refrigerator is described as an example in the embodiments, however, the present disclosure is not limited thereto. For example, it should be appreciated that all types of refrigerators having at least one partitioned storage space are applicable to the embodiments.

First, a structure of a refrigerator according to an embodiment will be described in detail with reference to FIGS. 1 and 2. FIG. 1 is a perspective view of a refrigerator according to an embodiment. A refrigerator 1 according to an embodiment may include a cabinet 10, a door 20, and a dispenser 26. The cabinet 10 may represent a storage space defined in the refrigerator 1.

The door 20 may be rotatably coupled to a side of the cabinet 10 to selectively open or close the front of the cabinet 10. The door 20 may be coupled to the cabinet 10 through a hinge, and thus rotatably mounted on the cabinet 10. Also, the door 20 may include a pair of refrigerating compartment doors 22 for selectively opening or closing the refrigerating compartment provided in an upper portion of the cabinet 10 and a freezing compartment door 24 that is mounted as a drawer type to selectively open or close the freezing compartment provided in a lower portion of the cabinet 10.

The dispenser 26 may provide ice and drinking water according to user's manipulation so that a user may externally dispense the ice and drinking water with the door 20 closed. The dispenser 26 may be disposed on a front surface of the door 20.

Figure 2:
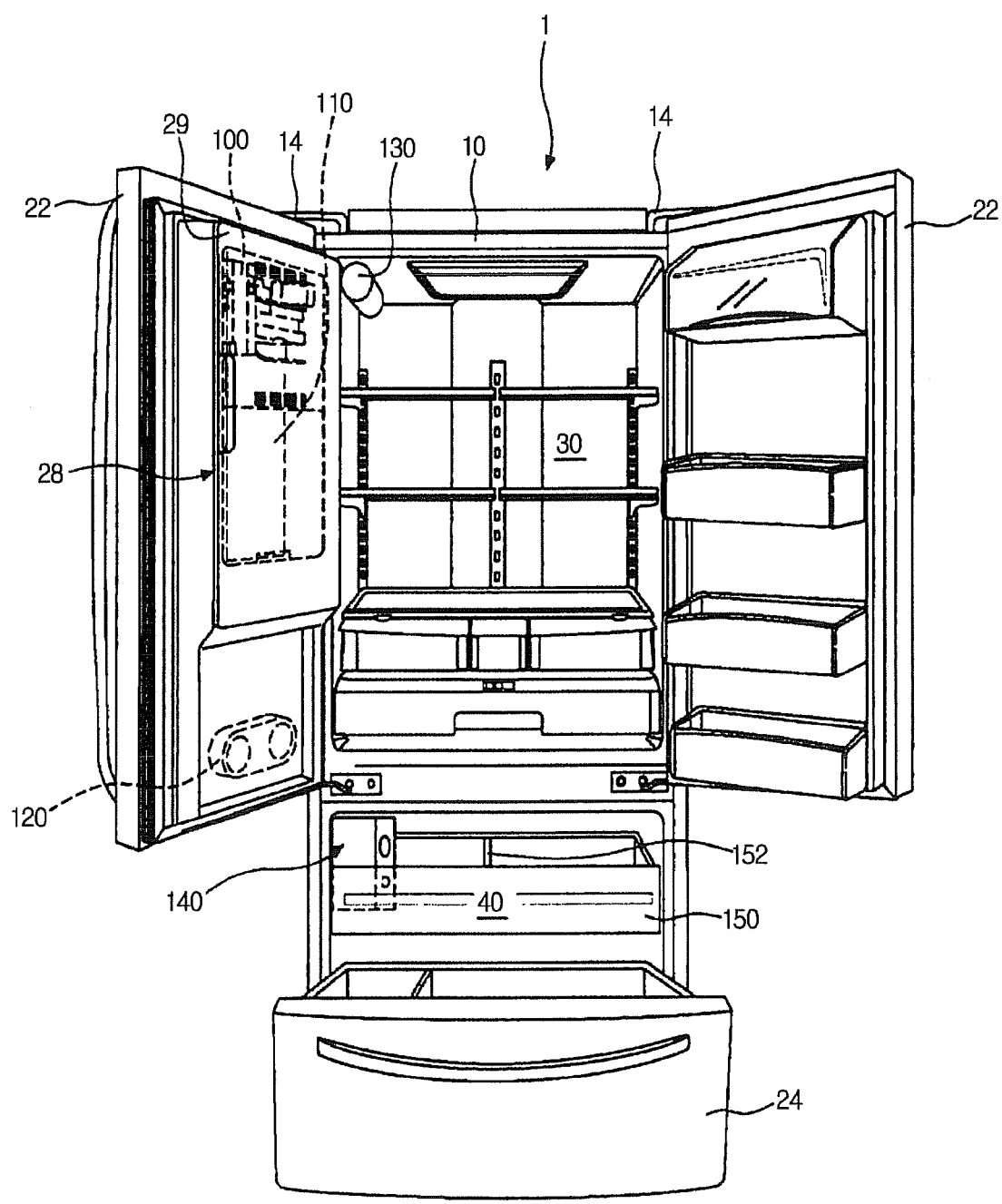
FIG. 2 is a front view of the refrigerator with a door opened according to an embodiment.

FIG. 2 is a front view of the refrigerator with a door opened according to an embodiment. The inside of the cabinet 10 may be vertically partitioned by a barrier or an inner case defining an inner storage space to define the refrigerating compartment 30 and the freezing compartment 40 at the upper and lower portions thereof.

A plurality receiving members such as shelves, drawers, and baskets may be provided inside of each of the refrigerating compartment 30 and the freezing compartment 40 and each of the refrigerating compartment door 22 and the freezing compartment door 24 to receive foods therein.

An ice making chamber 28 may be provided in a back surface of the freezing compartment door 22. The ice making chamber 28 may be provided as an insulation space that is independent from the inside of the refrigerating compartment to accommodate a first ice maker 100 and an ice bank 110 which makes and stores ice.

In detail, the ice making chamber 28 may be defined by a door liner defining a back surface of the refrigerating compartment door. Also, the inside of the ice making chamber 28 may be opened or closed by an ice making chamber door 29 that is movably mounted. The inside of the ice making chamber 28 may communicate with the dispenser 26 to dispense the ice through the dispenser 26.

The first ice maker 100 makes ice by using water supplied by a water supply passage. In detail, the first ice maker 100 may receive water for making ice to cool the water for a preset time or when reaching a preset temperature, thereby making ice. Then, the first ice maker 100 automatically separates the made ice to transfer the separated ice to the ice bank 110. Also, the first ice maker 100 may detect whether ice is received in the ice bank 110 by a preset amount or more to stop the ice making operation of the first ice maker 100. The ice bank 110 may be disposed under the first ice maker 100 to store the ice transferred from the first ice maker 100. Also, the ice bank 110 may communicate with the dispenser 26 to supply the stored ice into the dispenser 26 when the dispenser 26 is manipulated. Also, an auger for preventing the stored ice from adhering to each other and a crusher for crushing the stored ice to dispensing ice pieces may be provided in the ice bank 110.

A water tank 120 may be disposed inside the refrigerating compartment door 22. The water tank 120 may temporarily store water to be supplied into the dispenser 26. The water tank 120 may be disposed in a lower portion of the refrigerator compartment door 22.

Also, a water filter 130 may be disposed on a top surface of the inside of the refrigerating compartment 30. The water filter 130 purifies the water supplied into the dispenser 26. The water filter 130 may be disposed inside the refrigerating compartment 30 and may be configured to be replaceable.

A second ice maker 140 may be disposed on an upper edge of the freezing compartment 40. The second ice maker 140 may receive the water flowing along the water supply passage to make ice. The second ice maker 140 may be exposed to the inside of the freezing compartment 40.

Figure 3:
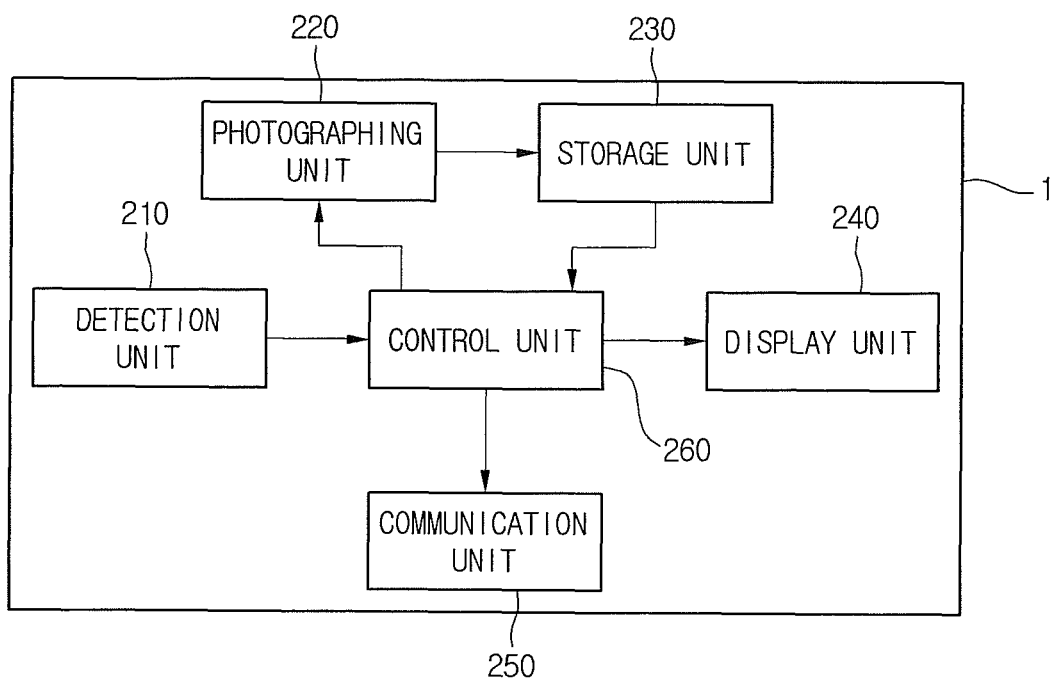
FIG. 3 is a block diagram of the refrigerator according to an embodiment.

FIG. 3 is a block diagram of the refrigerator according to an embodiment. The refrigerator 1 may include a detection unit 210, a photographing unit 220, a storage unit 230, a display unit 240, a communication unit 250, and a control unit 260.

The detection unit 210 may include an optical sensor, a mechanism or mechanical sensor, a magnetic field sensor, a camera, or the like, but the present disclosure is not limited thereto. The detection unit 210 may detect an opening/closing operation or opened angle of the door 20 by using signals acquired through various sensors and images photographed through the camera according to the control of the control unit 260.

Here, the various sensors may be disposed on a wall of the cabinet 10, a wall of the door 20, in the hinges of the door 20, or the like, but the present disclosure is not limited thereto. Also, the various sensors may be provided in plurality.

The optical sensor may be a sensor for detecting presence of light as well as an intensity of the detected light. The optical sensor may be a proximity sensor for detecting whether an object to be detected approaches thereto. Thus, the optical sensor may detect an opened or closed state of the door 20 or an opened angle of the door 20 by using the existence/non-existence and intensity of the detected light.

The mechanism sensor may be a sensor for detecting external contact and include a switch sensor. That is, the mechanism sensor may detect the external contact to detect an opened or closed state of the door 20 or an opened angle of the door 20.

The magnetic field sensor may be a sensor for detecting an intensity and direction of magnetic fields and lines and may include a hall sensor. The magnetic field sensor may detect a change in intensity or direction of magnetic fields to detect an opened or closed state of the door 20 or an opened angle of the door 20.

The camera may be disposed at a position at which an internal image of the refrigerator 1 may be photographed and may be provided in plurality. For example, the camera may capture a prescribed pattern of the door 20 to determine the opened or closed state of the door 20 in order to determine whether to capture the image of the internal compartments. That is, the detection unit 210 may process the internal image of the refrigerator 1 photographed by the camera to detect an opened or closed state of the door 20 or an opened angle of the door 20 according to an output value of the pattern.

Alternatively, the detection unit 210 may include an encoder that is provided in a drawer of the refrigerator 1. In general, the drawer may include a wheel so that the drawer may be slidably withdrawn. The encoder may detect a position of a groove through which light is transmitted according to the rotation of the wheel by using a contact point thereof due to the rotation of the wheel or the optical sensor to detect movement of the drawer.

The detection unit 210 disposed in the drawer may detect a withdrawal operation or a degree in which the drawer is withdrawn. For example, the detection unit 210 may detect a direction in which the drawer is moved in order to detect whether the drawer is being inserted or withdrawn. Alternatively, the detection unit 210 may detect a number of revolutions of the wheel by using the encoder to detect the degree in which the drawer is inserted or withdrawn.

Hereinafter, the door 20 or drawer to be opened or closed may be commonly called a door. Alternatively, the door and the drawer may be distinguished from each other.

As previously discussed, the detection unit 210 may detect a position and/or movement of the door 20. The detection unit 210 may be configured to determine state of the door, such as whether the opening/closing operations of the door 20 has started, or may send signals associated with the position and movement of the door 20 such that the control unit 260 can determine the state of the door 20.

When the photographing unit 220 is provided inside the refrigerator 1, the photographing unit 220 may photograph the inside of the refrigerator 1 according to the control of the control unit 260. The photographing unit 220 may include a camera for capturing images.

The camera may operate in a standby mode or photographing mode, but the present disclosure is not limited thereto. The standby mode may represent an operational mode of the camera in which the camera is powered on and stands by ready to photograph the internal image of the refrigerator 1 at a specific point in time. The photographing mode may represent an operational mode of the camera in which the camera is powered on and controlled to capture an image. The photographing unit 220 may photograph the entire inside or a portion of the inside of the refrigerator 1 according to a position of the camera.

The photographing unit 220 may store the photographed image in the storage unit 230 according to the control of the control unit 260. The storage unit 230 may store the image photographed by the photographing unit 220 according to the control of the control unit 260. The storage unit 230 may provide the stored image to the control unit 260 according to the control of the control unit 260.

The display unit 240 may include a display part such as an LCD panel for displaying an image or a user interface (UI) according to the control of the control unit 260. The display unit 240 may be disposed on the front surface of the refrigerator 1, e.g., the front surface of the door 20.

The display unit 240 may display the image photographed by the photographing unit 220 or the image stored in the storage unit 230. The display unit 240 may display the image according to an input selected by the user. In addition, the display unit 240 may display a user button for controlling the displayed image. The user button for controlling the displayed image may represent a user button for storing, transmitting, or deleting the displayed image, but the present disclosure is not limited thereto.

The communication unit 250 may transmit the image photographed by the photographing unit 220 or the image stored in the storage unit 230 to an external device or receive information from the external device according to the control of the control unit 260. The communication unit 250 may transmit the internal image of the refrigerator 1 as an event according to a preset schedule or based on an input selected by the user. Alternatively, the communication unit 250 may transmit the internal image of the refrigerator 1 in response to a request transmitted from the external device.

The communication unit 250 may receive information related to a list of goods which are lacking or cooking recipes using the goods stored in the refrigerator 1 in response to the internal image of the refrigerator 1 from the outside, but the present disclosure is not limited thereto.

The control unit 260 may control each of operation or an overall mutual operation of the detection unit 210, the photographing unit 220, the storage unit 230, the display unit 240, and the communication unit 250 of the refrigerator 1. For example, the control unit 260 may determine a specific point in time just before the door is closed, by using the opened or closed state or the opened degree of the door detected by the detection unit 210. When the specific point in time is determined by the control unit 260, the control unit 260 may control the photographing unit 220 to photograph the internal image of the refrigerator 1 and control the storage unit 230 to store the photographed image.

Also, the control unit 260 may control the display unit 240 to display the image photographed or stored according to business operator's or user's selection. Also, the control unit 260 may control the communication unit 250 to allow the communication unit 250 to transmit the captured or stored image to an external device or receive information from the external device.

Figure 4:
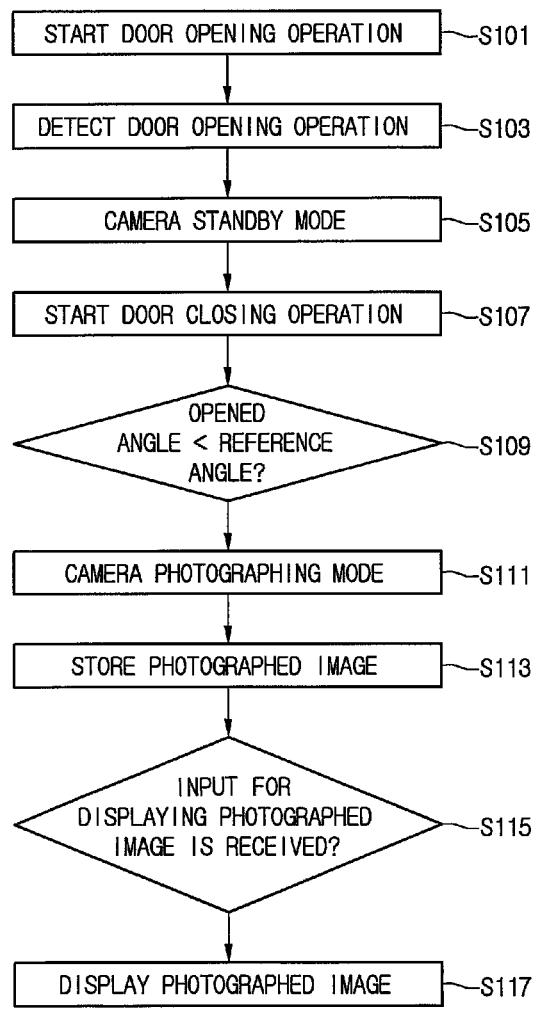
FIG. 4 is a flowchart for explaining an operating method of the refrigerator according to an embodiment.

FIG. 4 is a flowchart illustrating a method of operating the refrigerator according to an embodiment. When a door opening operation starts by a user's manipulation in operation S101 (e.g., door starts to open), a control unit 260 may detect the door opening operation through a detection unit 210, in operation S103.

When the door opening operation is detected, the control unit 260 may control a photographing unit 220 so that a camera of the photographing unit 220 operates in a standby mode, in operation S105.

Then, when the door closing operation starts by the user's manipulation in operation S107 (e.g., door starts to close), the control unit 260 may detect a door closing operation through the detection unit 210. Here, the control unit 260 may recognize an angle of the door (e.g., door-opened angle) as detected by the detection unit 210. For example, the angle of the door may represent an opened angle of a door 20 or an opened degree of a drawer.

In operation S109, the control unit 260 may determine whether the recognized opened angle is less than a reference angle. Here, the reference angle may represent an angle of the door that is a criterion for determining a point in time for controlling the camera to capture an image. Alternatively, the reference angle may be preset by a user or manufacturer.

For example, the reference angle may represent a maximum angle of the door 20 in which it can be closed by only magnetic force on the door 20 of the refrigerator 1. The reference angle may be set to a minimum angle of the door 20 just prior to closing at which the door 20 or a shelf on the door 20 does not interfere with an area to be photographed. Moreover, the reference angle may be set to other prescribed angles of the door 20 such as a point immediately prior to the internal lights turning off, or another appropriate state of the door 20. The control unit 260 may determine the state of the door for controlling the photographing unit 220 in the case where the prescribed angle is a preset value or corresponds to a point in time just prior to the door being fully closed. A reference angle according to one embodiment will now be described with reference to FIG. 5.

Figure 5:
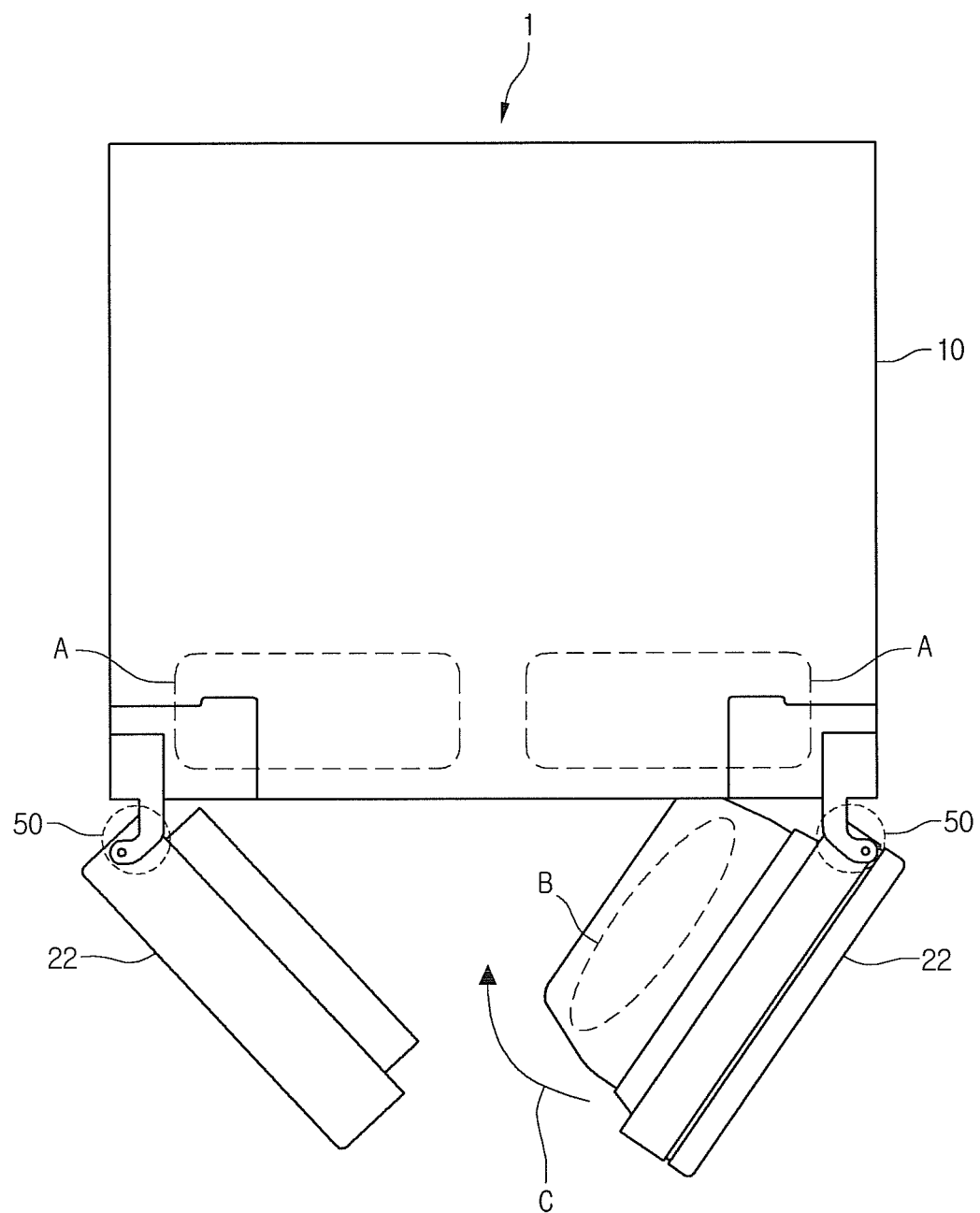
FIG. 5 is a plan view for explaining a reference angle of a refrigerator door according to an embodiment.

FIG. 5 is a plan view to illustrate a reference angle of a refrigerator door according to an embodiment. Here, a refrigerating compartment 30 provided in an upper portion of a cabinet 10 may include receiving members such as shelves and drawers which are disposed on a front surface of a refrigerating compartment door 22 as well as a receiving member such as a basket disposed in the refrigerating compartment 30 near a lower portion of the refrigerating compartment door 22 in a state where the refrigerating compartment door 22 is closed.

Referring to FIG. 5, if it is assumed that a basket A, disposed in the refrigerating compartment 30 near the bottom portion of the refrigerating compartment door 22, is photographed by a camera disposed on a ceiling of the inside of the refrigerating compartment 30, an entire plane of the basket A may be photographed only when the refrigerating compartment door 22 is opened at a specific angle.

In detail, the basket A disposed in a lower portion of the refrigerating compartment 30 may be gradually covered by a self-shelf B disposed on the refrigerating compartment door 22 as the refrigerating compartment door 22 is closed, when viewed in aspect of camera's view. Here, when viewed in aspect of camera's view, an angle just before the basket A disposed on the lower portion of the refrigerating compartment 30 is covered by the shelf B of the refrigerating compartment door 22 may be determined as the reference angle.

After the closing operation of the refrigerating compartment door 22 starts, the control unit 260 may continuously compare an opened angle of the refrigerating compartment door 22 detected by the detection unit 210 with the reference angle. Here, for example, the detection unit 210 may include a sensor provided at the hinge 50. Thus, the control unit 260 may determine a point in time just before the basket A disposed on the lower portion of the refrigerating compartment 30 is covered by the shelf B of the refrigerating compartment door 22 as a photographing mode activation mode to control the camera to photograph the entire plane of the basket A disposed on the lower portion of the refrigerating compartment 30.

When the opened angle of the door is less than the reference angle, the control unit 260 may control the camera included in the photographing unit 220 to operate in a photographing mode to capture an image, in operation S111. Then, in operation S113, the control unit 260 may store the image photographed by the photographing unit 220 in a storage unit 230. It should be appreciated that the number and location of cameras as well as the region to be photographed may be changed based on the type of the refrigerator as well as the area for which an image is desired. Moreover, the reference angle of the door for entering the photographing mode may be set based on the position and configuration of the cameras.

Also, when a user input for displaying the photographed image is received in operation S115, the control unit 260 may control a display unit 240 to display the photographed image, in operation S117. Although not shown, when the user input for displaying the photographed image is received, the control unit 260 may control the display unit 240 to display the stored image. Also, if preset conditions are satisfied, the display unit 260 may control the display unit 240 to display the image even when the user input for displaying the image is not received.

Hereinafter, various embodiments in which the latest internal image of the refrigerator that is acquired by the above-described various methods is transmitted to a personal mobile terminal or a business operator's server and then utilized will be described with reference to FIGS. 6 to 9.

Figure 6:
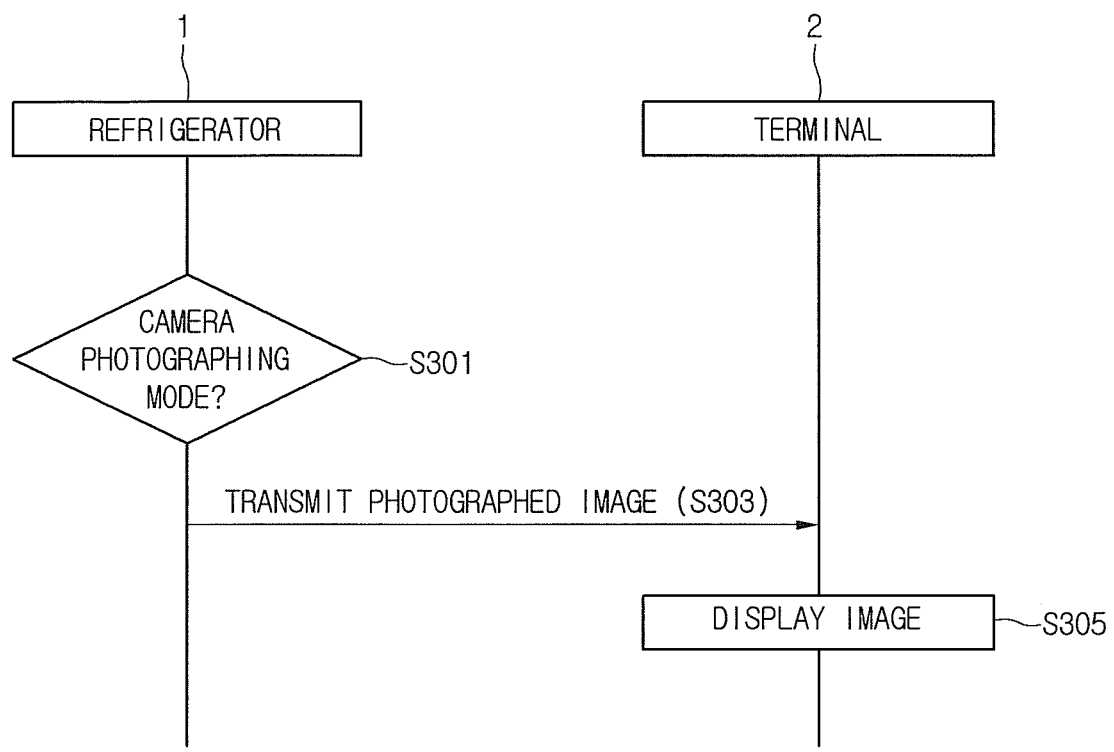
FIG. 6 is a ladder diagram for explaining an operating method of a refrigerator according to another embodiment.

FIG. 6 is a ladder diagram that illustrates a method of operating a refrigerator according to another embodiment. While a control unit 260 controls an operational mode of a camera through the processes described with reference to FIG. 4, when it is determined that the camera operates in a photographing mode, in operation S301, the control unit 260 may control a photographing unit 220 so that an image photographed by the photographing unit 220 is transmitted to a terminal 2 as an event, in operation S303. The terminal 2 may include a personal digital assistant (PDA), a tablet PC, a laptop computer, a desktop PC, a mobile phone, or another appropriate type of external device, but the present disclosure is not limited thereto.

Here, the control unit 260 may transmit the photographed image to the terminal 2 immediately when an image is photographed by the photographing unit 220. Alternatively, after the image photographed by the photographing unit 220 is stored in the storage unit 30, the control unit 260 may transmit the stored image to the terminal 2 at preset periods of time or intervals, based on a schedule or in response to an event, but the present disclosure is not limited thereto.

In operation S305, the terminal 2 may display the received image. For example, the image may be displayed according to a user selection. The terminal 2 may execute an application for receiving and displaying the internal image of the refrigerator according to the user's selection or may perform a multimedia service to display the internal image of the refrigerator. Accordingly, the internal image may be confirmed by using the mobile terminal, allowing the user to remotely view contents of the refrigerator without having to manually inspect the inside of the refrigerator.

Figure 7:
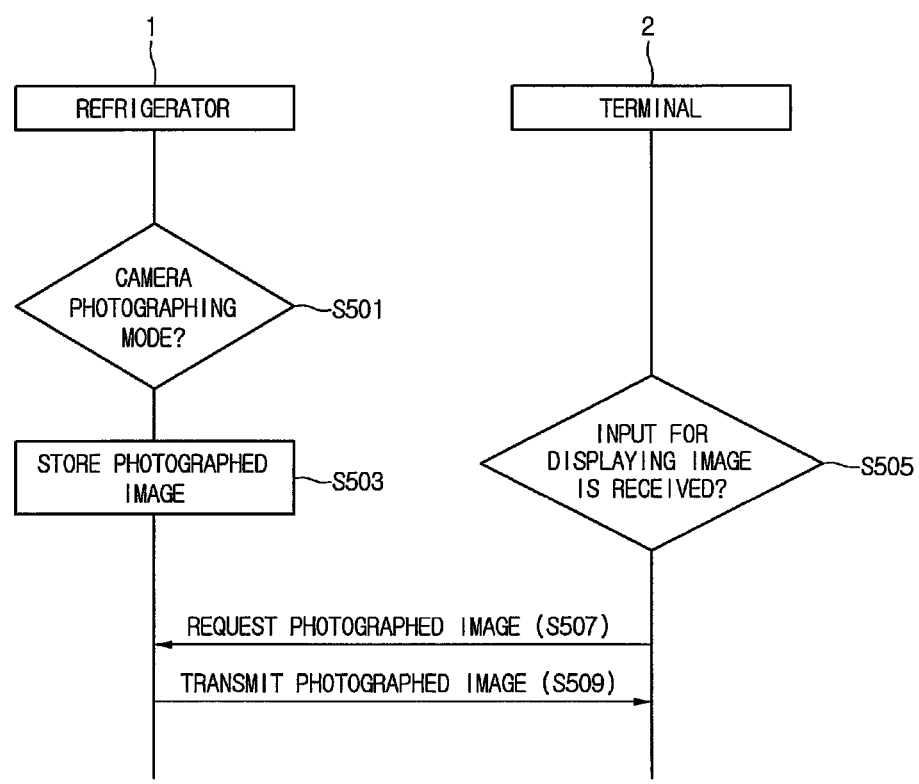
FIG. 7 is a ladder diagram for explaining an operating method of a refrigerator according to another embodiment.

FIG. 7 is a ladder diagram illustrating a method of operating a refrigerator according to another embodiment. While a control unit 260 controls an operational mode of a camera as described above, when it is determined that the camera operates in a photographing mode, in operation S501, the control unit 260 may control a photographing unit 220 so that an image photographed by the photographing unit 220 is stored in a storage unit 230 in operation S503. Here, in operation S501, the control unit 260 may control a camera mounted in the refrigerator to capture an image of a prescribed area of the refrigerator compartment.

Then, when an input for displaying the present internal image of a refrigerator 1 is received from a terminal 2, in operation S505, the terminal 2 may transmit a photographed image request command to the refrigerator 1, in operation S507. Then, in operation S509, the control unit 260 may control a communication unit 250 so that the latest photographed and stored internal image of the images stored in the storage unit 230 is transmitted to the terminal 2 in response to the image request command, in operation S509.

According to the current embodiment, since the communication between the mobile terminal and the refrigerator may be performed only in response to a request for the image such as a user input at the terminal 2, the refrigerator may more efficiently or economically operate. Hereinafter, although only the transmission of the image in response to the request is described, the image may also be transmitted as an event as illustrated in FIG. 6, but the present disclosure is not limited thereto.

Figure 8:
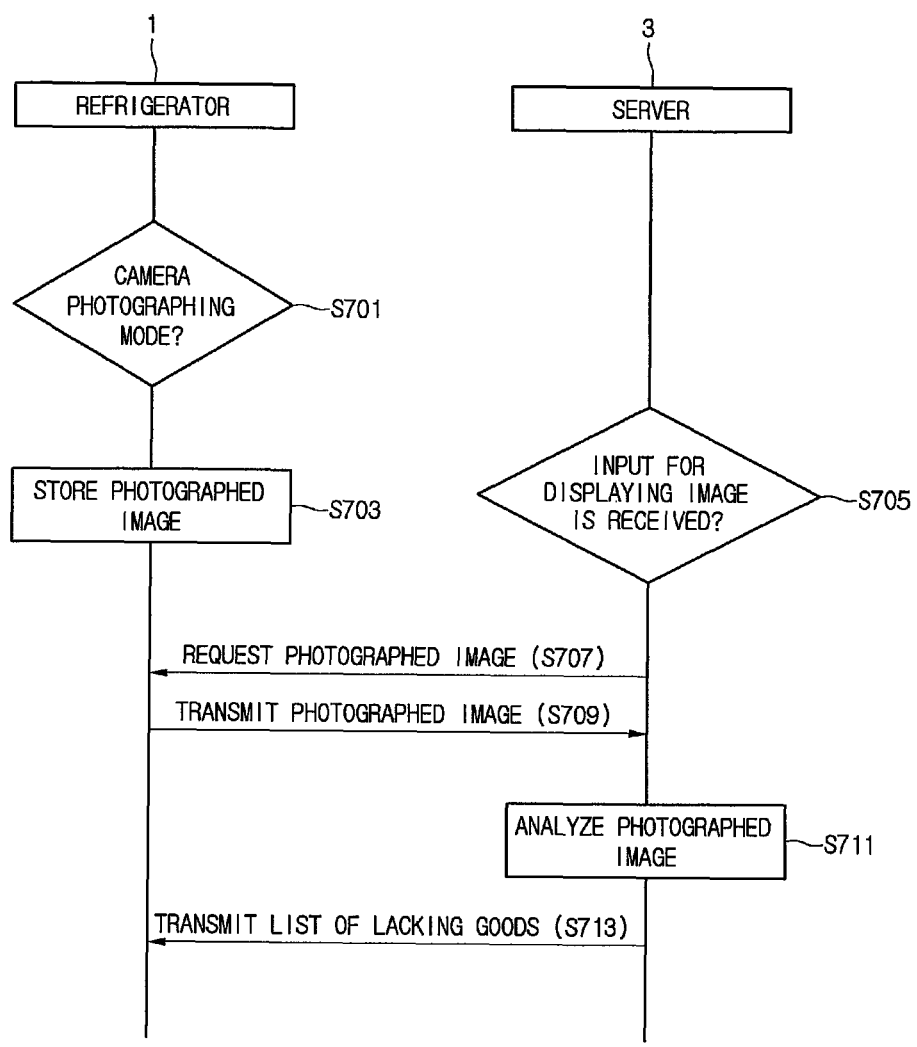
FIG. 8 is a ladder diagram for explaining an operating method of a refrigerator according to another embodiment.

FIG. 8 is a ladder diagram illustrating a method of operating a refrigerator according to another embodiment. While a control unit 260 controls an operational mode of a camera as described above, when it is determined that the camera operates in a photographing mode, in operation S701, the control unit 260 may control a photographing unit 220 so that an image photographed by the photographing unit 220 is stored in a storage unit 230, in operation S703. Here, in operation S701, the control unit 260 may control a camera mounted in the refrigerator to capture an image of a prescribed area of the refrigerator compartment.

Then, when an input for displaying the internal image of a refrigerator 1 is received from a server 3, in operation S705, the server 3 may transmit a photographed image request command to the refrigerator 1, in operation S707. Here, the server 3 may transmit the photographed image request command to the refrigerator 1 at a preset period without a user input. The server 3 may be a market server such as a vendor or a retail server for a grocery store or market, or the like.

Also, in operation S709, the control unit 260 may control a communication unit 250 so that the latest photographed and stored internal image of the images stored in the storage unit 230 is transmitted to the server 3 in response to the image request command, in operation S709.

In operation S711, the server 3 receiving the latest photographed internal image of the refrigerator 1 may analyze the photographed image. The server 3 may analyze the photographed image to determine goods presently stored in the refrigerator 1 and goods that are not presently stored in the corresponding refrigerator 1. Then, the server 3 may extract information required for providing a service such as the analysis of the goods that are not presently stored the corresponding refrigerator 1. For example, the server 3 may generate a grocery list based on the received image of the refrigerator 1. In operation S713, the server 3 may transmit a list of goods lacking in the refrigerator 1 (e.g., the grocery list) as extracted though the analysis of the photographed image to the corresponding refrigerator 1.

Figure 9:
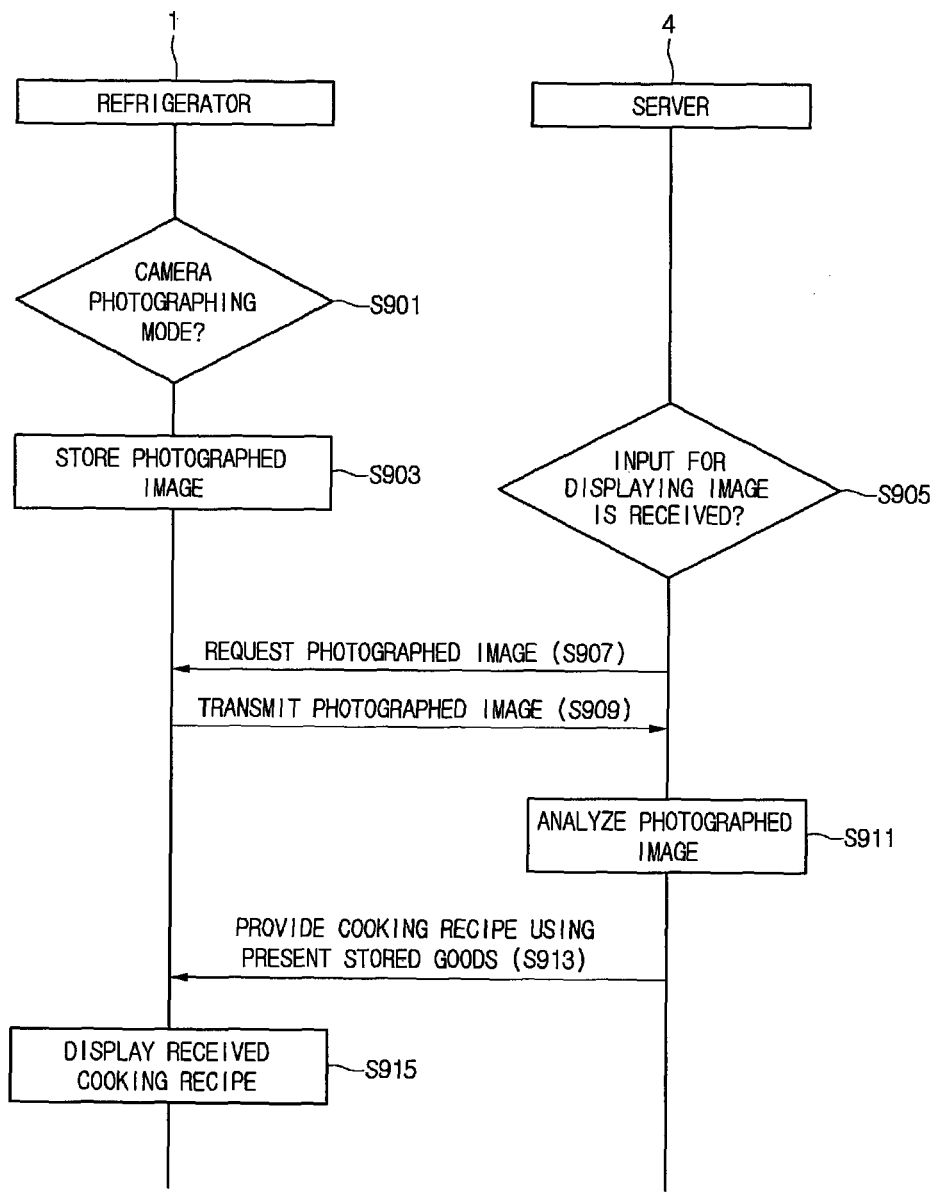
FIG. 9 is a ladder diagram for explaining an operating method of a refrigerator according to another embodiment.

FIG. 9 is a ladder diagram illustrating a method of operating a refrigerator according to another embodiment. While a control unit 260 may control an operational mode of a camera as described above, when it is determined that the camera operates in a photographing mode in operation S901, the control unit 260 may control a photographing unit 220 so that an image photographed by the photographing unit 220 is stored in a storage unit 230, in operation S903. Here, in operation S901, the control unit 260 may control a camera mounted in the refrigerator to capture an image of a prescribed area of the refrigerator compartment.

Then, when an input for displaying the internal image of a refrigerator 1 is received from a server 4, in operation S905, the server 4 may transmit a photographed image request command to the refrigerator 1, in operation S907. The server 4 may transmit the photographed image request command to the refrigerator 1 at a preset period without the user input. Here, the server 4 may be a business operator's server such as a broadcasting server that provides various types of content or services. The server 4 may be a server for a food manufacturer or a third party service provider.

Also, in operation S909, the control unit 260 may control a communication unit 250 so that the latest photographed and stored internal image of the images stored in the storage unit 230 is transmitted to the server 4 in response to the image request command.

In operation S911, the server 4 receiving the latest photographed internal image of the refrigerator 1 may analyze the photographed image. The server 4 may analyze the photographed image to check goods presently stored in the refrigerator 1. Then, the server 4 may extract information required for proving a service such as cooking recipes using the goods presently stored in the refrigerator 1.

In operation S913, the server 4 may transmit information with respect to the cooking recipes using the goods presently stored in the refrigerator 1 through the analysis of the photographed image. In operation S915, the control unit 260 may display the information, which is received from the server 4, of the cooking recipes using the goods presently stored on a display unit 240.

According to the current embodiment, the corresponding business operator may accurately determine the contents of the refrigerator that is located remotely (e.g., at the home or enterprise) to provide the service related to the refrigerator suitable for the corresponding home or enterprise. According to an aspect of the present disclosure, the present image of goods stored in a refrigerator may be acquired to provide contents of the refrigerator to the user. According to another aspect of the present disclosure, the present internal situation of the refrigerator may be obtained by the business operator to provide information related to food required by a customer and/or various types of services.

As broadly described and embodied herein, a refrigerator is provided in which a present image of goods stored therein is acquired when a refrigerator door is closed to provide the current internal situation of the refrigerator to a user and an operating method thereof. Embodiments also provide a refrigerator in which the present internal situation of the refrigerator may be obtained by a business operator to receive information related to foods required for a person from the business operator and an operating method thereof.

In one embodiment, an operating method of a refrigerator comprising a camera therein may include: detecting whether a door closing operation starts; comparing an opened angle of a door with a reference angle from a time point at which the starting of the door closing operation is detected; and photographing the inside of the refrigerator by using the camera when the opened angle is less than the reference angle according to the compared result.

In another embodiment, a refrigerator may include: a detection unit detecting at least one of whether a door closing operation starts, whether a door opening operation starts, and an opened angle of a door; a photographing unit operating in a standby mode or a photographing mode, the photographing unit photographing the inside of the refrigerator in the photographing mode; and a control unit controlling the photographing unit so that the photographing unit operates in the standby mode when the detection unit detects the starting of the door opening operation, the control unit comparing the opened angle of the door with a reference angle from a time point at which the detection unit detects whether the door closing operation starts to control the photographing unit so that the photographing unit operates in the photographing mode at a time point at which it is determined that the opened angle is less than the reference angle.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
   a detection device that detects at least one of a position or movement of a door of the refrigerator;
   a camera to capture an image of an area to store food inside the refrigerator;
   a controller to control the camera to capture the image based on the detected position or movement of the door, and a communication interface, wherein when a request for an image from an external terminal is received at the communication interface, the controller controls to transmit the captured image or a stored image of the area inside the refrigerator captured by the camera to the external terminal in response to the request from the external terminal such that a user can see the image, wherein a start of a door opening operation and a door closing operation is detected based on the detected position or movement of the door, when the door opening operation is detected, the camera is controlled to operate in a standby mode, when the door closing operation is detected, an angle of the door is compared with a reference angle, when the angle of the door is less than the reference angle, the camera is controlled to operate in a photographing mode to capture the image of the area inside refrigerator, and wherein the standby mode is an operational mode of the camera in which the camera is powered on and stands by ready to photograph and the photographing mode is an operational mode of the camera in which the camera is powered on and controlled to capture an image.

2. The refrigerator according to claim 1, further comprising a storage device that stores the image of the refrigerator captured by the camera.

3. The refrigerator according to claim 1, further comprising a display that displays the captured image or the stored image according to a user input.

4. The refrigerator according to claim 1, wherein the external terminal is at least one of a mobile phone, PDA, tablet, laptop computer or a desktop computer.

5. The refrigerator according to claim 1, wherein when a request for an image from an external server is received at the communication interface, the controller controls to transmit the captured image or the stored image to the external server in response to the request from the external server, and receive information related to contents of the refrigerator according to an analysis of the image from the external server.

6. The refrigerator according to claim 5, wherein the information related to contents of the refrigerator includes at least one of a list of goods lacking in the refrigerator or information for recipes using goods stored in the refrigerator.

7. The refrigerator according to claim 6, further including a display, wherein at least one of the list of goods or information for recipes received from the external server are displayed on the display.

8. The refrigerator according to claim 1, wherein, prior to determining whether the position or movement of the door corresponds to the door closing operation, detecting a door opening operation based on the detected position or movement of the door, and the controller controlling the camera to operate in a standby mode when the door opening operation is detected.

9. The refrigerator according to claim 1, wherein the reference angle corresponds to a minimum angle of the door at which the area inside the refrigerator to be photographed is not obstructed by the door.

10. A method of operating a refrigerator having a camera, the method comprising:

detecting, at a sensor, a position and movement of a door of the refrigerator;

determining whether the position and movement of the door corresponds to a door opening operation;

controlling the camera to operate in a standby mode when the door opening operation is detected;

determining, at a controller, whether the position and movement of the door corresponds to a door closing operation;

comparing an angle of the door with a reference angle during the door closing operation; and capturing, at a camera mounted inside the refrigerator, an image of an area to store food inside the refrigerator in a photographing mode when the angle of the door is less than the reference angle; and receiving a request for an image from an external terminal; and transmitting the captured image or a stored image of the area inside the refrigerator captured by the camera to the external terminal in response to the request from the external terminal such that a user can see the image.

11. The method according to claim 10, further comprising storing the image of the refrigerator.

12. The method according to claim 10, further comprising:

receiving a user input for displaying the image of the area inside the refrigerator; and displaying the captured image or the stored image according to the received user input.

13. The method according to claim 10, wherein the external terminal is at least one of a mobile phone, PDA, tablet, laptop computer or a desktop computer.

14. The method according to claim 10, further comprising:

receiving a request for an image from an external server;

transmitting the captured image or the stored image to the external server in response to the request from the external server; and receiving information related to contents of the refrigerator according to an analysis of the image from the external server.

15. The method according to claim 14, wherein the information related to contents of the refrigerator includes at least one of a list of goods lacking in the refrigerator or information for recipes using goods stored in the refrigerator.

16. The method according to claim 15, further comprising displaying at least one of the list of goods or information for recipes received from the external server.

17. The method according to claim 10, wherein the reference angle corresponds to a minimum angle of the door at which the area inside the refrigerator to be photographed is not obstructed by the door.

* * * * *